Figure 1:
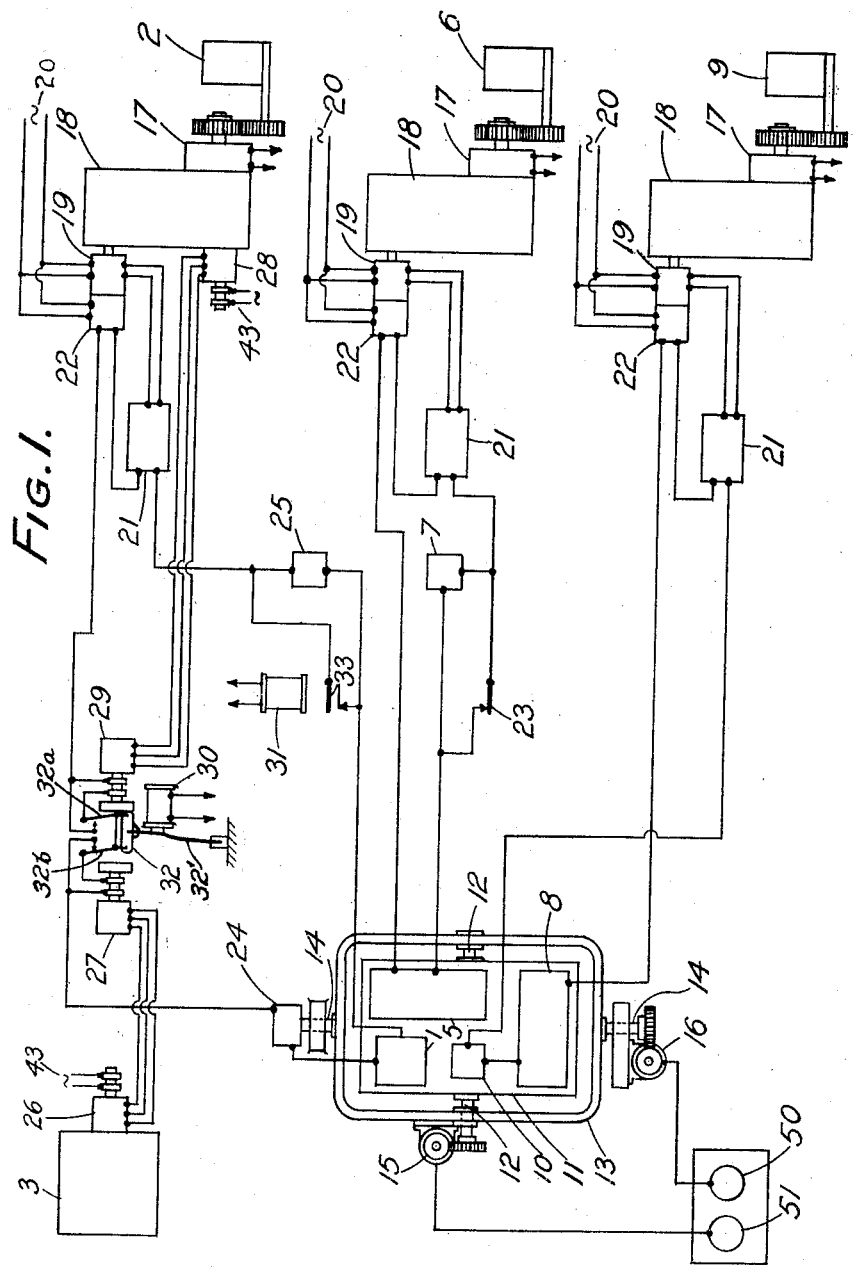

Aug. 19, 1952     F. W. MEREDITH     2,607,550
AUTOMATIC CONTROL APPARATUS

Filed March 20, 1946     4 Sheets-Sheet 2

INVENTOR
Frederick W. Meredith
By Watson, Cole, Grindle & Watson

Aug. 19, 1952  F. W. MEREDITH  2,607,550
AUTOMATIC CONTROL APPARATUS
Filed March 20, 1946  4 Sheets-Sheet 4

INVENTOR
Frederick W. Meredith
By Watson, Cole, Grindle & Watson

Patented Aug. 19, 1952

2,607,550

UNITED STATES PATENT OFFICE 2,607,550

AUTOMATIC CONTROL APPARATUS

Frederick William Meredith, London, England, assignor to S. Smith & Sons (England) Limited, London, England, a British company Application March 20, 1946, Serial No. 655,684
In Great Britain March 9, 1945

9 Claims. (Cl. 244—77)

This invention relates to automatic control apparatus for aircraft and is particularly concerned with making provision for changing course by means of banked turns.

Such apparatus, according to the present invention, comprises means for measuring the rate of turn of the aircraft in azimuth and controlling the course of the aircraft according to the measured rate of turn to maintain a given course by control of the rudder, course-changing means for effecting a change of course at a predetermined rate and means responsive to lateral acceleration or side slip for varying the predetermined rate for the purpose of controlling the lateral acceleration or side slip when the craft is banked to effect a change of course.

Preferably the means for measuring the rate of turn generates an electrical signal proportional to the rate of turn which is applied to the input of an amplifier, the rudder being controlled by the output from the amplifier so that it tends to maintain the input to the amplifier substantially zero, and the means for effecting a change of course applies a counter signal in opposition to the rate-of-turn signal to the input of the amplifier whereby the value of the counter signal determines the rate of change of course.

The rudder may conveniently be operated at a rate which is a function of the rate of turn. If the rudder is operated at a rate which is directly proportional to the rate of turn the inherent damping of the aircraft will normally ensure stability, but the control exercised by the means responsive to lateral acceleration or side slip detracts from this damping especially in the case of an aircraft carrying an inadequate fin surface so that instability may result. To overcome this, means may be provided for measuring the rudder displacement and controlling the rudder also in accordance with the measured displacement to introduce damping to compensate for loss of damping due to the means responsive to lateral acceleration or side-slip.

Means may be provided for rendering the means responsive to lateral acceleration or sideslip inoperative during straight flight.

Means for setting a predetermined angle of bank may be coupled to the means for effecting a change of course to select a predetermined rate of change of course which is correct for the set angle of bank and a predetermined air speed. The predetermined air speed may be the speed of the craft and means responsive to air speed may also be associated with the means for effecting a change of course to vary the rate accordingly. Alternatively the predetermined air speed may be the cruising speed of the craft.

The bank setting means may comprise a platform tiltable in bank relatively to the aircraft to set the angle of bank carrying a device for measuring rate of roll and controlling the ailerons in accordance with the measured rate of roll. A device such as a pendulum responsive to tilt in bank may then provide an additional or monitoring control for the ailerons during straight flight.

The invention will now be described by way of example with reference to the accompanying drawings of which—

Figure 2:
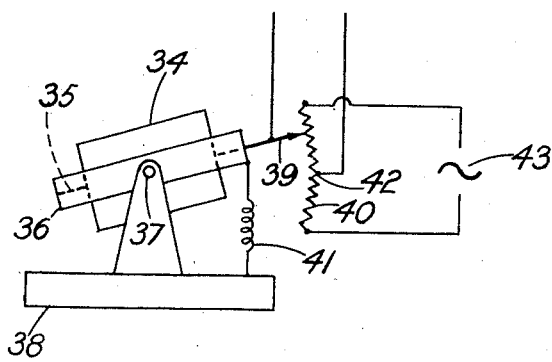
Figure 3:
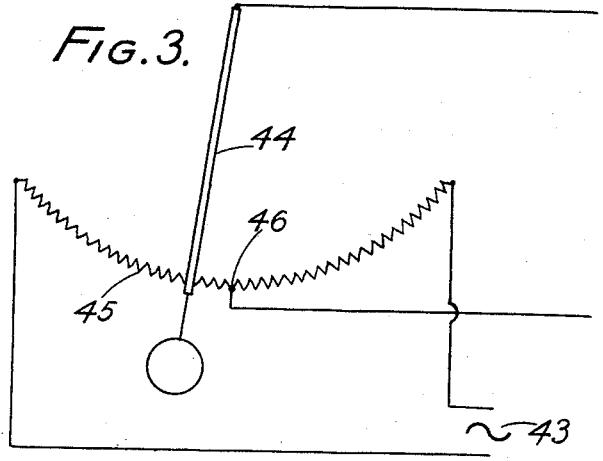
Figure 4:
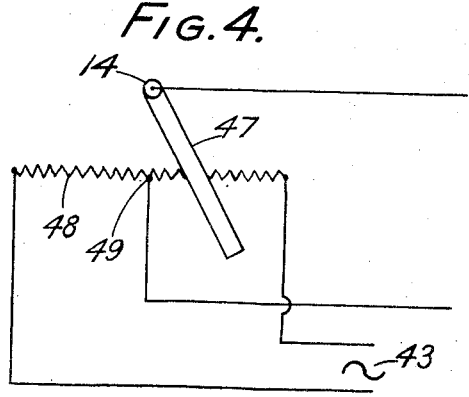
Figure 5:
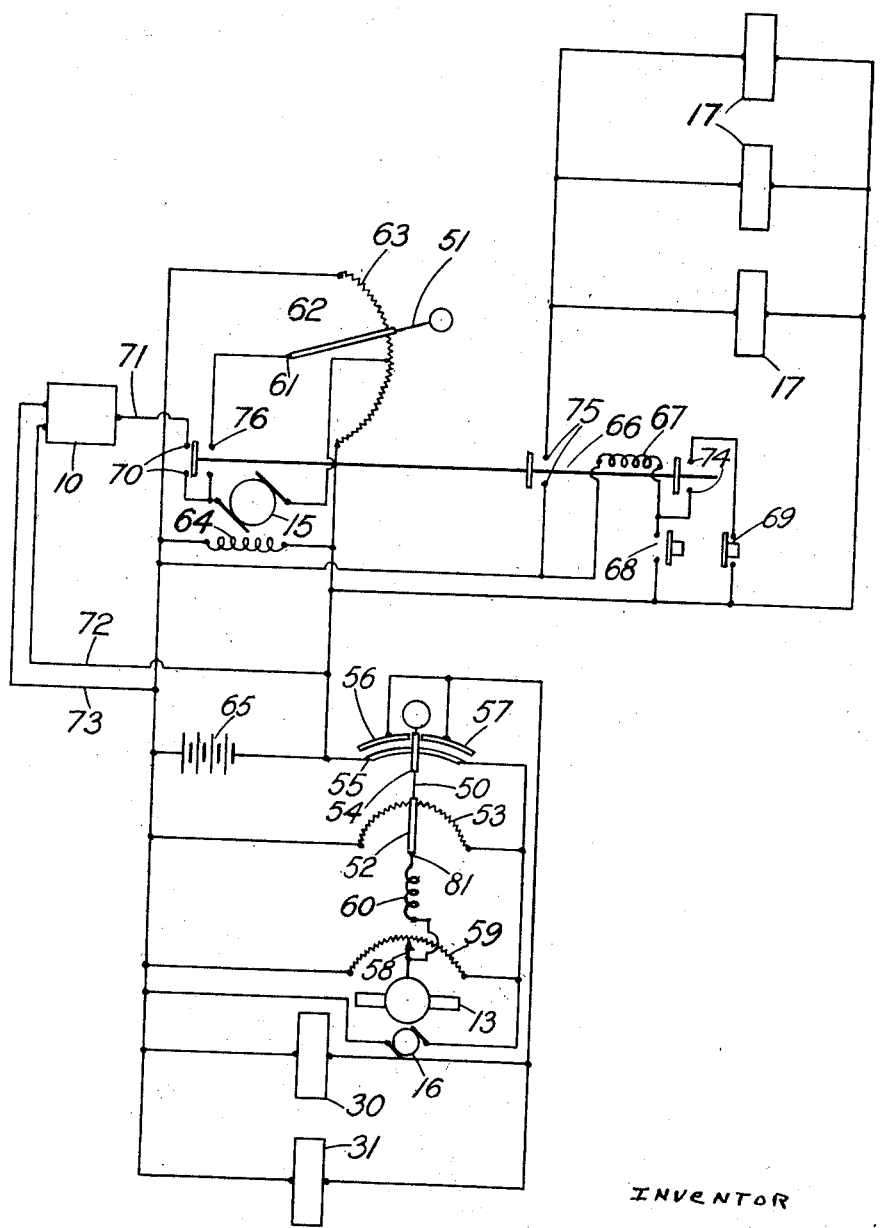
Figure 6:
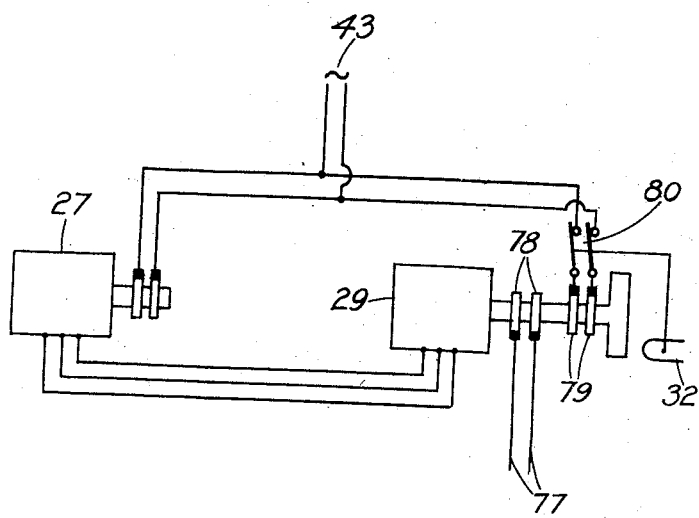
Figure 7:
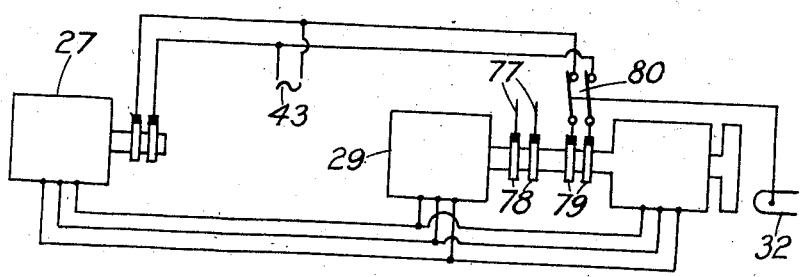

Figure 1 illustrates diagrammatically the layout of an automatic control system for controlling an aircraft about all three axes, Figure 2 illustrates in further detail the rate-of-turn instruments shown in Figure 1, Figure 3 illustrates in further detail the pendulums shown in Figure 1, Figure 4 illustrates in further detail the tangent potentiometer shown in Figure 1, Figure 5 illustrates in further detail the control circuits shown in Figure 1, and Figures 6 and 7 show modifications of the transmitters and receivers shown in Figure 1.

As shown in Figure 1, the aircraft is stabilised about all three axes by means of three rate-of-turn gyroscopes. A rate-of-turn gyroscope 1 controls the rudder 2 to stabilise the aircraft in yaw, a compass-controlled directional gyroscope 3 serving as a course monitor during straight flight. A rate-of-turn gyroscope 5 controls the ailerons 6 to stabilise the aircraft in roll, a bank pendulum 7 serving as a bank monitor. A rate-of-turn gyroscope 8 controls the elevators 9 to stabilise the aircraft in pitch, a pitch pendulum 10 serving as a pitch monitor.

The three rate-of-turn gyroscopes 1, 5 and 8 and the pitch pendulum 10 are mounted on a platform 11 gimballed about the pitch axis 12 in a gimbal ring 13 pivoted in the aircraft about the roll axis 14. The platform 11 can be rotated about the pitch axis 12 relatively to the ring 13 by means of a motor 15 mounted on the ring 13. The ring 13 can be rotated relatively to the aircraft about the roll axis 14 by a motor 16 mounted on the aircraft. The platform 11 can thus be moved to any desired position in pitch or roll relatively to the aircraft by means of the two motors 15 and 16 and during straight flight conditions, the platform is centrally positioned about the roll axis.

Each of the control surfaces, rudder 2, ailerons 6 and elevators 9, is coupled through a clutch 17 and gear box 18 to an electric hysteresis motor 19 of the kind described in British patent specifications Nos. 576,248 and 576,249. Each motor 19 is wound for two-phase operation, one phase (a reference phase) being coupled to an A. C. source 20, and the other phase, the control phase, being coupled to the output of an amplifier 21. Each motor 19 is coupled to an asynchronous tachometric signal generator of any known kind. Each generator is also wound for two-phase operation, one phase being connected to the source 20 so that an output proportional to the speed of the generator and therefore of the motor is generated in the other phase.

The rate gyroscopes will be described in greater detail hereinafter, and it will suffice for an understanding of Figure 1 to state that a voltage is produced across the output terminals of each rate-of-turn gyroscope which is proportional to the rate of turn and is of the same frequency as that of the source 20 but is in quadrature therewith lagging or leading according as the turn is in one direction or the other. The pendulums and their electric circuits will also be described in greater detail hereinafter and it will suffice for an understanding of Figure 1 to state that a voltage is produced across their electrical output terminals proportional to the deviation of the pendulum from its central position and is of the same frequency as that of the source 20 but is in quadrature therewith lagging or leading according as the deviation is in one direction or the other. With this preliminary explanation the operation of the individual control surfaces will now be more fully considered.

Considering first the operation of the elevator control it will be seen that the sum of three voltages is applied to the input of the amplifier 21 of the elevator control. These voltages are proportional respectively to the rate of pitch of the aircraft as measured by the rate-of-turn gyroscope 8, the deviation in pitch of the platform 11 from the apparent horizontal as measured by the pitch pendulum 10 and the speed of the motor 19. The pendulum 10 is purely a monitor, that is it gives a comparatively weak signal compared with those derived from the rate-of-turn gyroscope 8 and the generator 22, and its effect on the operation of the motor 19 during a disturbance may be neglected. Addition of the voltages is effected by connecting the output of the devices 8, 10, 22 in series. The motor 19 drives the generator 22 which generates a voltage opposing the voltage derived from the device 8. The motor 19 thus operates to reduce the input to the amplifier and since the gain of the amplifier is made very large it will reduce this input substantially to nothing. That is to say during a disturbance the motor will run at such a speed that the output of the generator 22 is substantially equal but opposite to the output of the rate-of-turn device 8, or in other words the motor 19 and therefore the elevators 9 will be operated at a speed proportional to the rate of pitch. This will have the effect of very rapidly stabilising any disturbance in pitch. If after the disturbance is stabilised the platform 11 is not level in pitch, the electrical signal from the pitch pendulum 10 will unbalance the system until the platform 11 is level.

The operation of the aileron control will first be considered under straight flight conditions. As will be explained hereinafter, under straight flight conditions a pair of contacts 23, shown as short-circuiting the bank pendulum 7, is open.

It will thus be seen that the control of the ailerons 6 is similar to that of the elevators, the aircraft being stabilised in roll by operating the ailerons at a speed proportional to the rate of roll as measured by the rate-of-turn gyroscope 5, and the aircraft being monitored to a level position after any disturbance by signals from the bank pendulum 7. In this case of aileron control, however, the pendulum 7 is mounted on the aircraft and not on the platform 11.

Before considering the operation of the rudder control circuit it is necessary to say a word about the components in this circuit. As in the other circuits there is a rate-of-turn gyroscope 1 measuring rate of yaw. Mounted on the axis 14 is a tangent potentiometer 24. This will be described in greater detail hereinafter and it will suffice for an understanding of Figure 1 to state that a voltage appears across the output terminals of the potentiometer 24 which is proportional to the tangent of the angle through which the platform 11 is turned in roll from its normal central position by the motor 16 and is of the same frequency as that of the source 20 but in quadrature therewith lagging or leading according as the turn is in one direction or the other. A pendulum 25 in all respects similar to the pendulum 7 is provided to detect side slip. A signal proportional to the deviation in yaw is obtained from the directional gyroscope 3 by means of an electric induction transmitter 26 and receiver 27 of the type known under the trade name "Selsyn." The rotor winding of the transmitter 26 is supplied with single-phase A. C. from a source 43 in quadrature with but of the same frequency as the source 20 and said rotor is rotated by the directional gyroscope 3. If the rotor winding of the receiver 27 is short-circuited, it will follow the movements of the transmitter rotor, and if at any instant the receiver is fixed and the short circuit removed from its winding a voltage will appear across this winding proportional to the deviations of the transmitter rotor and therefore of the directional gyroscope 3 relatively to the craft from the positions they occupied at the instant in question. In a similar manner signals proportional to the deviations of the rudder are obtained by means of a transmitter 28 and receiver 29. As before, short-circuiting of the rotor winding of the receiver 29 causes it to follow the movements of the rotor of transmitter 28 and therefore of the rudder, and fixing of the rotor of receiver 29 and the removal of the short circuit causes a voltage to appear across the rotor winding of the receiver 29 proportional to the deviations of the rudder from the position it occupied at the instant when that rotor was fixed.

The operation of the rudder 2 will first be considered under straight flight conditions. Under these conditions a pair of relays 30 and 31, shown in Figure 1 in their energised positions, are de-energised. When the relay 30 is de-energised a brake member 32 carried by a resilient element such as a leaf spring 32' moves to the left in the drawing releasing the rotor of receiver 29 and fixing the rotor of receiver 27. At the same time the rotor winding of receiver 29 is short-circuited by the engagement of the contact arm 32a with the adjacent fixed contact, and that of receiver 27 put into circuit by the disengagement of contact arm 32b from its fixed contact. The rotor of receiver 29 thus proceeds to follow the rudder movements as explained above so that its winding is maintained in a position of zero output. Meanwhile a voltage appears across the rotor winding of receiver 27 which is proportional to the deviations in yaw of the aircraft from the course it was on at the instant the relay 30 was de-energised. When the relay 31 is de-energised the previously-mentioned contacts 23 are opened and a pair of contacts 33 closed to short circuit the electrical output of the pendulum 25. Thus the only signals appearing in the rudder control circuit are a signal from the rate-of-turn gyroscope 1 proportional to rate of yaw, a signal proportional to deviation from course, and a signal from the generator 22 proportional to rudder speed. The aeroplane is thus stabilised against disturbances in yaw and is monitored to the correct course in a manner which will be obvious from the description already given of the elevator and aileron controls.

Change of course is effected by banked turns. To achieve this the gimbal ring 13 is rotated by the motor 16 and thereby the relays 30 and 31 are operated. The aircraft is thus rotated in roll at the same rate as but in the opposite direction to the gimbal ring 13 to maintain the platform 11 horizontal. When the aircraft has rotated through the desired angle of bank the motor 16 is stopped. Any disturbance of the pendulum 7 during the turn cannot affect the aileron control as the output of this pendulum is now short-circuited by closing of the contacts 23.

Rotation of the gimbal ring 13 will produce a signal from the tangent potentiometer 24 proportional to the tangent of the angle of bank of the aircraft. As is well known, for a correctly banked turn the rate of turn is directly proportional to the tangent of the angle of bank and inversely proportional to the air speed. The constant of proportionality of the tangent potentiometer 24 is selected to give a signal equal but opposite to that given by the rate-of-turn instrument 1 when the aircraft is turning at the correct rate and travelling at its cruising speed. In operation the aircraft will turn so as to maintain these two signals equal and will therefore turn at the speed set by the tangent potentiometer 24. Energisation of the relay 30 releases the rotor of the receiver 27 and at the same time short-circuits its winding. The rotor thus follows the movements of the directional gyroscope 3 during the turn. Energisation of relay 31 opens contacts 33 and puts the pendulum 25 in circuit to detect side slip. If the aircraft is turning at the correct speed there will be no signal from the pendulum 25. On the other hand if the aircraft is not turning at the correct speed, for example due to the air speed differing from the cruising speed, then side slip will take place and the pendulum 25 will give a signal to increase or decrease the rate of turn accordingly. The signal from the pendulum 25 detracts from the inherent damping of the system, and it is therefore necessary to introduce damping by supplying a signal proportional to rudder displacement. This is obtained from the rotor winding of the receiver 29 which is now in circuit with its rotor held by the member 32.

When the aircraft has turned on to the new course the gimbal ring 13 is returned to its original position and the relays 30 and 31 de-energised. The bank is thus taken off and further turning stopped. The course is now monitored by the signal from the receiver 27 which will be zero when the aircraft is on the new course since the rotor has been following the directional gyroscope during the turn.

The attitude of the aircraft in pitch can be varied by rotating the platform 11 in pitch by means of the motor 15. As will be obvious from the description already given the aircraft will turn in pitch to maintain the platform level.

A suitable rate-of-turn gyroscope for use as gyroscope 1, 5 or 8 is illustrated diagrammatically in Figure 2. As there shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42.

Thus, when there is no rate of turn about an axis normal to the base 38 the contact 39 engages point 42. If there is a component of rate of turn about such an axis the gyroscope will precess about the axis 37 against the restraint of the spring 41, the spring being deformed in compression if the rate of turn is in one direction but in tension if it is in the other. The electrical output will thus be of a magnitude proportional to the magnitude of the rate of turn and of one phase or the other according as to whether the direction of the turn is in one direction or the other.

It will be appreciated that the rate-of-turn gyroscope described above may be arranged to measure rate of turn about any of the three aircraft axes and that the three gyroscopes may readily be made interchangeable.

As an alternative to the use of gyroscopes in the arrangement described with reference to Figure 1, the rate-of-turn devices described in U. S. Patent Specification No. 2,455,939 may be used.

A pendulum suitable for use as pendulum 7, 10 or 25 is illustrated diagrammatically in Figure 3. As there shown a pendulum 44 of suitable conducting material is pivoted to swing about an axis parallel to the roll axis in the case of pendulums 7 and 25 and parallel to the pitch axis in the case of pendulum 10. The pendulum 44 sweeps across an arcuate resistance 45 connected to the A. C. source 43, so that the electrical output appears between the pendulum 44 and the mid point 46 of the resistance 45.

The tangent potentiometer 24 is illustrated diagrammatically in Figure 4. As there shown, an arm 47 of conducting material is attached to the axis 14 so as to rotate with the gimbal ring 13 and sweeps over a linear resistance 48 connected across the A. C. source 43. The output appearing between the arm 47 and the mid point 49 of the resistance is thus proportional to the tangent of the angle through which the gimbal ring 13 is turned.

In the arrangement shown in Figure 1 control is effected by means of a turn control lever 50 and a pitch control lever 51, the lever 50 being rotated in roll to right or left to effect turns to right or left and the lever 51 being rotated in pitch forwards or backwards to move the nose of the aircraft up or down. These two levers may conveniently be combined in the form of a miniature joy stick, but their operation will be more readily understood by considering them as two separate levers. Their operation will be clear from a consideration of Figure 5. As there shown the lever 50 is pivoted at 81 and carries a contact strip 52 insulated from the lever 50 and sweeping over an arcuate potentiometer resistance 53 and a contact strip 54 also insulated from the lever 50 and in permanent engagement with a contact segment 55 and adapted to engage either a contact segment 56 or a contact segment 57 according as the lever is moved in one direction or the other from its central position. The motor 16 rotates through gearing the gimbal ring 13 which drives a contact arm 58 over a potentiometer resistance 59. The motor 16 is a D. C. motor and has a field winding 60 connected between the contact strip 52 and the contact arm 58.

The lever 51 is pivoted at 61 and carries a contact strip 62 sweeping over an arcuate potentiometer resistance 63. The motor 15 which rotates the platform 11 is a D. C. motor with a field winding 64 permanently connected across a battery 65 which supplies the energy for the control circuit. A change-over switch 66 is provided for putting the automatic control into and out of operation. This switch has an operating coil 67 controlled by push buttons 68 and 69 for energising and de-energising the switch respectively. The switch is shown in the de-energised position, that is in the manual control position. In this position one brush of the motor 15 is connected to the pendulum 10 through contacts 70 and lead 71. The lead 71 is connected to a contact on the pendulum arm which is adapted upon displacement from its central position in one direction or the other to engage one or other of two segments connected respectively by leads 72 and 73 to the two terminals of the battery 65. The contact and segments are not shown in Figure 5 but the manner of providing them will be obvious. The other brush of the motor 15 is permanently connected to the mid point of the resistance 63. Hence any displacement of the pendulum causes the motor to run in one direction or the other. The motor runs to rotate the platform 11 to restore the pendulum displacement. Hence during manual control the platform will follow the movements of the pendulum 10. Consequently when the automatic control is put in operation it will continue to fly the aircraft in the same attitude in pitch.

To put the automatic control in operation push button 68 is pressed. This completes a circuit for the coil 67. When the switch operates, this circuit is completed through contacts 74 and the release push button 69. The automatic control can thus be instantly cut out of operation by pressing the push button 69. For convenience of operation this push button may be mounted on top of the miniature joy stick already mentioned.

When the switch 66 operates, a pair of contacts 75 operate the three clutches 17 and so put the automatic control in operation. At the same time the contacts 70 are opened and contacts 76 closed. The motor 15 is thus disconnected from the pendulum 10 and connected between the mid point of the resistance 63 and the contact strip 62 on the lever 51. Consequently when the lever 51 is in its central position (it is only shown displaced to enable the connections to be clearly seen) the motor armature is short-circuited and the motor is stationary. Movement of the lever 51 in one direction or the other will cause the motor to operate in one direction or the other at a speed proportional to the displacement. Hence the aircraft can be made to change its attitude in pitch at any desired rate while under automatic control.

During straight flight under automatic control the lever 50 is in its central position and the relays 30 and 31 de-energised. To change course, the lever 50 is rotated in one direction or the other. As soon as the contact strip 54 engages the segment 56 or 57 the relays 30 and 31 operate. It will be seen that the resistance 53 and 59 form the arms of a Wheatstone bridge of which the field winding 60 forms one diagonal. Displacement of the lever 50 unbalances the bridge and excites the field so that the motor operates to restore the balance. Consequently the motor 16 and therefore the gimbal ring 13 are displaced by the same amount as the lever 50. This determines the angle of bank and therefore the rate of turn so that the aircraft can be turned at any desired rate by displacing the lever 50 by the appropriate amount.

The method illustrated in Figure 1 for causing the receivers 27 and 29 to follow their respective transmitters may result, if the receivers are not suitably designed, in the receiver rotors having a tendency to move in steps in their toothed stators. To overcome this a modification is shown in Figure 6. In this modification the rotor of the receiver 29 has in addition to the signal winding connected to leads 77 through slip rings 78 a second winding in quadrature therewith connected to rings 79. The slip rings 79 are connected through switch contacts 80 to the same source 43 as the rotor of the transmitter 27. When the brake member 32 moves to the left to fix the rotor of the receiver, contacts 80 are opened. In operation, when the contacts 80 are closed, the receiver 29 operates as an ordinary "Selsyn" receiver following the movements of the transmitter 27.

In the above modification the part of the receiver rotor carrying the quadrature winding may be provided with a separate stator, so that the receiver in effect comprises two receivers of the "Selsyn" type with their rotors coupled together: such an arrangement is shown in Figure 7.

I claim:

1. In an automatic control system for aircraft in which means for measuring the angle of turn and the rate of turn in azimuth control the rudder to maintain a given course, means for effecting a banked turn comprising the combination of means for applying a predetermined angle of bank, means for rendering the means measuring the angle of turn in azimuth inoperative when the aircraft is banked, means for adjusting the control exercised by the means for measuring rate of turn to a value proportional to variations from a predetermined rate of turn determined by the angle of bank, whereby the aircraft is caused to turn in azimuth at said predetermined rate of turn, and a side-slip detector giving a response proportional to lateral acceleration for varying the rate of turn in azimuth to reduce side-slipping of the craft.

2. In an automatic control system, the combination as claimed in claim 1 comprising also means to render the detector responsive to side-slip inoperative during straight flight.

3. In an automatic control system for aircraft in which means are provided for generating electrical signals in accordance with the angle of turn and rate of turn in azimuth and in which the rudder is controlled in accordance with said signals to maintain a given course, means for effecting a banked turn on to a new course comprising the combination of means for applying a predetermined angle of bank, means for rendering the said means for generating an electrical signal in accordance with the angle of turn inoperative when the aircraft is banked, means for applying in opposition to the rate of turn signal an electrical signal proportional to a predetermined rate of turn determined by the angle of bank, a side-slip detector for generating an electric signal in accordance with the lateral acceleration, and means for applying said signal to the electric control circuit for the rudder whereby the predetermined rate of turn of the aircraft is followed to control lateral acceleration or sideslip when the craft is banked to effect a change of course.

4. In an automatic control system as claimed in claim 3, also means for rendering the said means responsive to lateral acceleration or side slip inoperative during straight flight.

5. In an automatic control system as claimed in claim 3, also means for measuring the rudder displacement and means for controlling the rudder also in accordance with the measured displacement to introduce damping to compensate for loss of damping due to the said means responsive to lateral acceleration or side slip.

6. In an automatic control system for aircraft in which means are provided for generating electrical signals in accordance with the angle of turn and rate of turn in azimuth and in which the rudder is controlled in accordance with said signals to maintain a given course, means for effecting a banked turn on to a new course comprising the combination of means for applying a predetermined angle of bank, means for rendering the said means for generating an electrical signal in accordance with the angle of turn inoperative when the aircraft is banked and means for applying in opposition to the rate of turn signal an electrical signal equal to that generated by the rate-of-turn device when the craft is turning without side slipping for the set angle of bank and a predetermined air speed.

7. In an automatic control system for aircraft in which means are provided for generating electrical signals in accordance with the angle of turn and rate of turn in azimuth and in which the rudder is controlled in accordance with said signals to maintain a given course, means for effecting a banked turn on to a new course comprising the combination of means for applying a predetermined angle of bank, means for rendering the said means for generating an electrical signal in accordance with the angle of turn inoperative when the aircraft is banked, means for applying in opposition to the rate of turn signal an electrical signal equal to that generated by the rate-of-turn device when the craft is turning without side slipping for the set angle of bank and the cruising speed of the aircraft, means responsive to lateral acceleration or side slip for generating an electrical signal in accordance with the side slip and means for applying said signal to the electrical control circuit for the rudder, whereby when the speed of the aircraft is other than the cruising speed, during a banked turn, the said predetermined rate of turn is varied to the value at which side slipping does not occur.

8. In an automatic control system for aircraft, the combination as claimed in claim 7 wherein the bank setting means comprises a platform tiltable in bank relative to the aircraft to set the angle of bank carrying a device for measuring rate of roll and controlling the ailerons in accordance with the measured rate of roll.

9. In an automatic control system for aircraft, the combination as claimed in claim 7 wherein the bank setting means comprises a platform tiltable in bank relative to the aircraft to set the angle of bank carrying a device for measuring rate of roll and controlling the ailerons in accordance with the measured rate of roll, and comprising also a device responsive to tilt in bank and controlling also the ailerons during straight flight.

FREDERICK WILLIAM MEREDITH.

REFERENCES CITED

The following references are of record in the file of this patent:

UNITED STATES PATENTS

| Number | Name | Date |
| --- | --- | --- |
| 2,005,530 | Boykow | June 18, 1935 |
| 2,162,862 | Protzen | June 20, 1939 |
| 2,270,875 | Hanson et al. | Jan. 27, 1942 |
| 2,283,754 | Matthews | May 19, 1942 |
| 2,323,151 | Meredith | June 29, 1943 |
| 2,371,388 | Glenny | Mar. 13, 1945 |
| 2,415,430 | Frische et al. | Feb. 11, 1947 |
| 2,464,629 | Young | Mar. 15, 1949 |